United States Patent
Ao

(10) Patent No.: US 7,342,388 B2
(45) Date of Patent: Mar. 11, 2008

(54) LOW RIPPLE LINE-STATE DEPENDENT PWM DCDC CONVERTER CONTROLLERS AND METHODS FOR SLIC SWITCHING LOAD REGULATION

(75) Inventor: Hai Ao, San Jose, CA (US)

(73) Assignee: Winbond Electronics Corporation, Hsinchu (TW)

( * ) Notice: Subject to any disclaimer, the term of this patent is extended or adjusted under 35 U.S.C. 154(b) by 0 days.

(21) Appl. No.: 11/584,136

(22) Filed: Oct. 19, 2006

(65) Prior Publication Data

US 2007/0296385 A1    Dec. 27, 2007

Related U.S. Application Data

(60) Provisional application No. 60/816,238, filed on Jun. 23, 2006.

(51) Int. Cl.
*G05F 1/40* (2006.01)
(52) U.S. Cl. ..................................... 323/284
(58) Field of Classification Search ................ 323/283, 323/284, 285
See application file for complete search history.

(56) References Cited

U.S. PATENT DOCUMENTS

| | | | |
|---|---|---|---|
| 4,490,580 A | 12/1984 | Nagashima | |
| 5,323,461 A | 6/1994 | Rosenbaum et al. | |
| 5,610,503 A | * 3/1997 | Fogg et al. | 323/283 |
| 6,668,060 B1 | 12/2003 | Boudreaux, Jr. | |
| 7,092,517 B2 | 8/2006 | Pruecklmayer et al. | |
| 7,095,847 B2 | 8/2006 | Tsuruya et al. | |
| 2005/0220293 A1 | 10/2005 | Hein et al. | |

OTHER PUBLICATIONS

Hong-Wei Huang et al., "Dithering Skip Modulator with a Novel Load Sensor for Ultra-wide-load High-Efficiency DC-DC Converters", Proceedings of the 2006 International Symposium on Low Power Electronics and Design, 2006, pp. 388-393.

* cited by examiner

*Primary Examiner*—Shawn Riley
(74) *Attorney, Agent, or Firm*—Blakely Sokoloff Taylor & Zafman LLP

(57) ABSTRACT

Low ripple line-state dependent PWM DCDC converter controllers and methods for subscriber line interface circuit switching load regulation. In accordance with the method, line state is monitored to determine the target voltage for that state, and a DCDC converter is controlled responsive to the line state and the difference between the actual line voltage and the target voltage for that line state. The differences between the actual line voltage and the target voltage for that line state are split into different ranges, each range having a skip step size and a step size associated therewith, the step size determining how many equal pulse width pulses will be provided to the converter before the pulse width is adjusted by the step size and the process repeated. Apparatus for practicing the invention and variations thereof are disclosed.

22 Claims, 3 Drawing Sheets

… …

LOW RIPPLE LINE-STATE DEPENDENT PWM DCDC CONVERTER CONTROLLERS AND METHODS FOR SLIC SWITCHING LOAD REGULATION

CROSS-REFERENCE TO RELATED APPLICATION

This application claims the benefit of U.S. Provisional Patent Application No. 60/816,238 filed Jun. 23, 2006.

BACKGROUND OF THE INVENTION

1. Field of the Invention

The present invention relates to the field of power management for VoIP and SLIC/CODEC.

2. Prior Art

In SLIC (subscriber line interface circuit) operation, different line states work with very different voltage and current load conditions in a totally event driven fashion. For instance, the phone will be in a ringing state until someone picks up the phone, then the line switches to the Active state. A pulse width modulated (PWM) power supply controller needs to adjust the output voltage/load change due to state change on the fly with minimal ripple produced in the line voltage. This is very challenging, since large load changes tend to produce voltage fluctuations. The present invention resolves PWM line supply ripple problems arising from undershoot and overshoot due to the high range of dynamic load switching coupled with large voltage changes of the DCDC converter in VoIP (voice over Internet protocol) SLIC applications. In general SLICs, the voltage/current requirements of an SLIC is line state dependent, and has a range from as low as 6V to as high as above 100V as standard requirements. The load current requirements are from as low 100 uA to 100 mA. Within this wide range of power regulation, a PWM DCDC converter needs to be fast and accurate with minimal ripple within a very stringent range such as 100 mV or less for good idle channel noise performance and voice quality. Therefore it is difficult to satisfy the dynamic load requirements, yet maintain a high quality ripple specification.

Various PWM DCDC algorithms have been proposed in the past. Typically they are confined to very specific applications, mostly fixed voltage with dynamic load current conditions or fixed load current and dynamic voltage swings. They are not designed for dynamic VoIP SLIC line state switching. The overshoot and undershoot requirements and external boost and buck of the prior art are not the same as required by VoIP SLIC application.

DETAILED DESCRIPTION OF THE PREFERRED EMBODIMENTS

Low ripple Line State Dependent PWM DCDC converter controllers and methods for SLIC switching load regulation are disclosed herein. In particular, the present invention associates pulse adjustment response rate to the line state as well as to how far away or different the output voltage Vbattery is from the target output voltage Vtarget.

Figure 1:
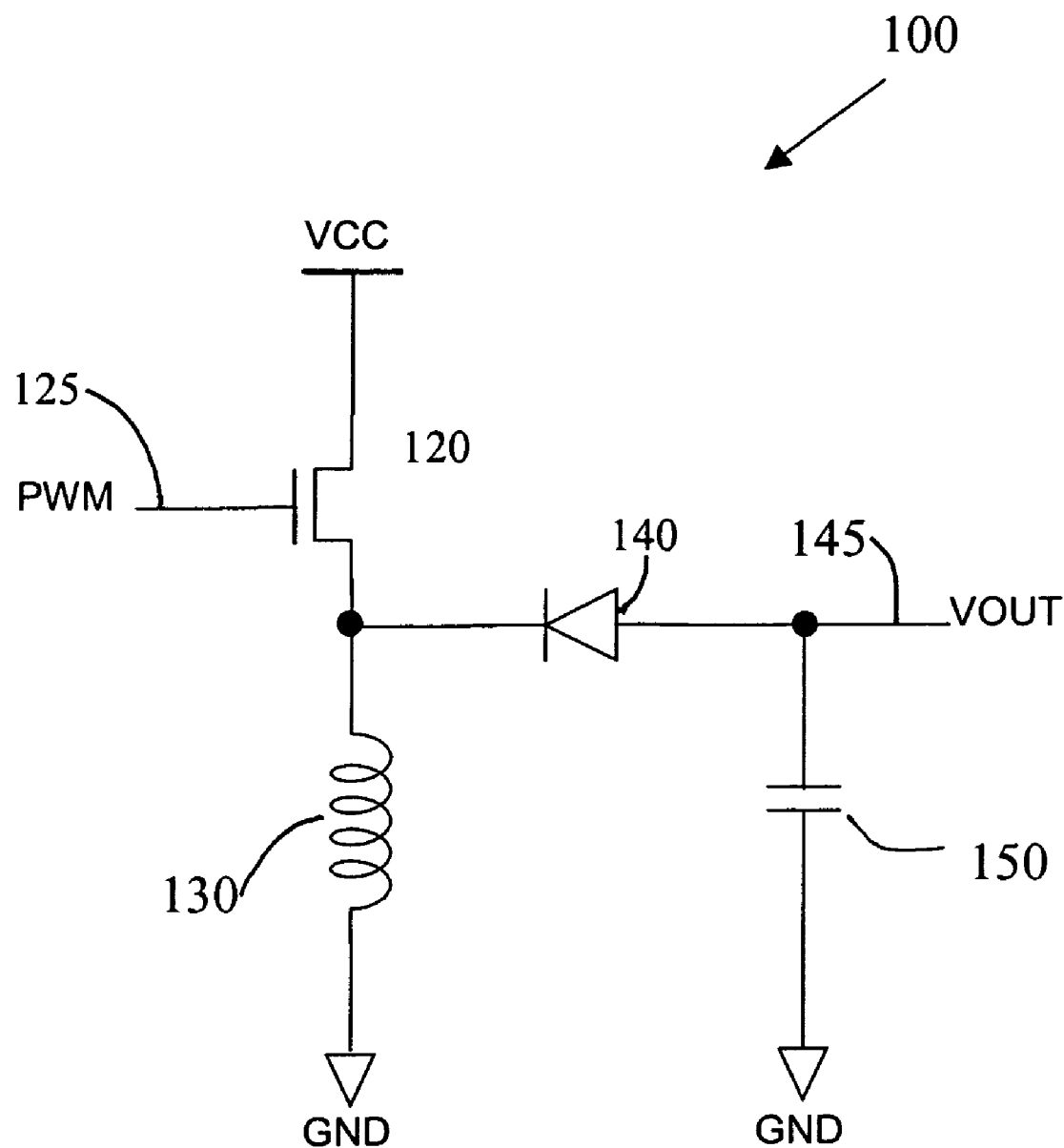
FIG. 1 is a circuit drawing for an exemplary DCDC converter circuit that may be used with the present invention.

An exemplary DCDC converter circuit 100 that may be used with the present invention may be seen in FIG. 1. As shown therein, a transistor 120 controlled by the output 125 of a pulse width modulator (PWM) repeatedly connects and disconnects inductor 130 across the input DC power supply VCC. When connected, the current in the inductor will increase at a rate $di/dt=Vcc/L$. When transistor 120 is turned off, the voltage across the inductor 130 will reverse, causing conduction through diode 140 to add a negative charge to the capacitor 150. In the preferred embodiment, the transistor 120 is turned on and off at a fixed frequency, with VOUT 145 being controlled by the duty cycle (on pulse width) of the PWM control signal. The greater the duty cycle (longer portion of each cycle transistor 120 is left on), the more energy delivered to the output VOUT.

In the disclosure to follow, it will be seen that the PWM signal is digitally controlled, operating at a fixed duty cycle for a number of cycles and then changing duty cycle depending on the difference between the target voltage Vtarget and the actual voltage VOUT (or Vbattery). The number of cycles between duty cycle changes is referred to herein as the skip period SK, and the change in duty cycle (pulse width) imposed after each skip period is referred to herein as the step size ST. Note that such a converter may provide an output voltage VOUT that is greater or less in magnitude than the input voltage, depending on its control.

Figure 2:
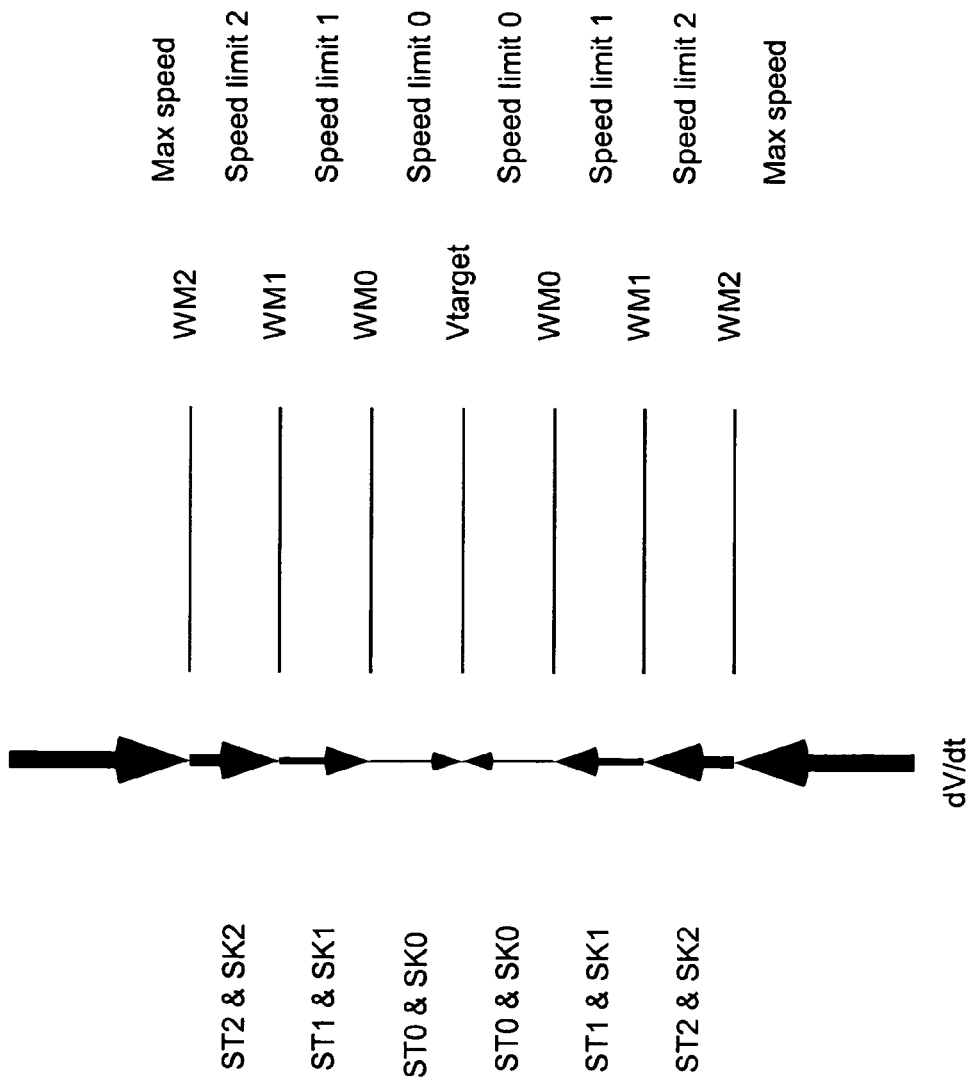
FIG. 2 illustrates the exemplary various line-state dependent voltage Watermarks for setting the skip periods and the step sizes in an embodiment of the present invention.

A preferred embodiment of the invention employs three voltage Water Marks for setting the skip period SK, and the step size ST, namely WM0, WM1 and WM2, as shown in FIG. 2. If the difference between the output voltage VOUT and the target voltage Vtarget is within a small range (between the two watermark limits WM0), then the pulse width adjustment acceleration and deceleration is the smallest by using a small step size (ST0) and large skip period (SK0). On the other hand, if the difference of voltage between VOUT and Vtarget is beyond a large range (WM2), then the pulse width adjustment acceleration and deceleration is the largest by using a large step size and small skip period per adjustment. For instance, Watermarks 0 (WM0) are closest to our target voltage, for example 4V, WM0 is associated with the smallest step size ST0 equal to, for example, 2 pulse units per adjustment and Skip Step size is equal to the largest skip period per adjustment, for example, 8 wait periods (PWM cycles) before adjustment to ensure a slow response rate. Water Mark 1 (WM1) is further away from the target voltage Vtarget, for example 10V, and is associated with a medium Step Size, for example 4 pulse units per adjustment and a medium Skip period, for example 4 periods before adjustment. Water Mark 2 (WM2) is further away from the target voltage Vtarget, for example 16V, and associated with the largest Step Size (ST2) for example 16 pulse units per adjustment and the smallest Skip period (SK2), for example 2 periods before adjustment to ensure a fast response rate. In SLIC line state dependent scenario, typically the three of the preferred embodiment provide fast response, minimum overshoot and low ripple around the target voltage Vtarget.

Figure 3:
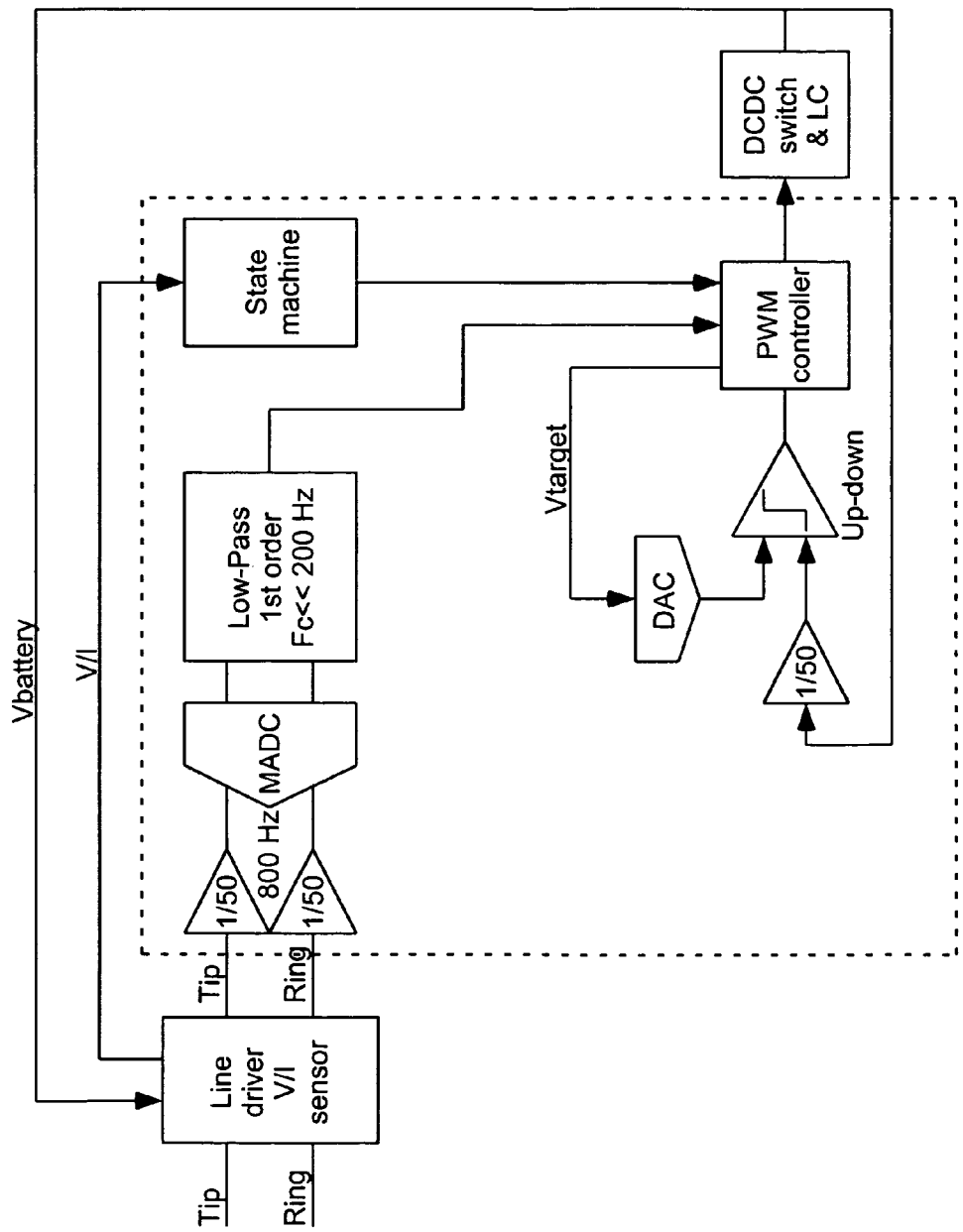
FIG. 3 illustrates the general structure of the PWM Controller of a preferred embodiment.

FIG. 3 illustrates the general structure of the PWM controller of a preferred embodiment. An on-chip PWM Controller block drives the DCDC Switch & LC tank of FIG. 1, which produces the battery voltage Vbattery (VOUT in FIG. 1) that in turn drives the Line Driver. The Line driver voltage on the tip and ring lines is then scaled (1/50) and converted to digital form by the MADC, low pass filtered and fed back to the PWM Controller. Also the output of the DCDC Switch & LC tank is scaled (1/50) and coupled as one input to the Up-down comparator, the output of which is coupled as an input to the PWM Controller. Finally, voltage and current sensors on the tip and ring lines provide inputs to a State machine having outputs coupled to the PWM Controller. The voltage and current values provided to the State machine indicate tip and ring line impedance, which in turn indicates tip and ring line state, independent of the tip and ring line voltages immediately after a change in line state.

The State Machine senses the line state as described above, and produces the line state dependent information for the PWM Controller to set the line state dependent sets of step size ST and skip period SP for the PWM Controller. In that regard, note that the State Machine has the actual line voltage from the line voltage sensor available to it, as well as the target voltage Vtarget as predetermined by the state machine for that state. Consequently the State Machine can determine the difference between the target voltage Vtarget for that state and the actual tip and ring line voltage to determine the applicable set of step size ST and skip period SP for the PWM Controller. If there are 5 distinctive line states, then there can be 5 sets of WM0 to WM2, ST0 to ST2 and SP0 to SP2 parameters. In other words, not only may the step size and the skip period be varied from line state to line state, but the voltage differences between the Vbattery and Vtarget at which the different step sizes and skip periods will be applied may be changed with each state change. Thus the PWM control algorithm employs switchable and programmable sets of WM0 to WM2, ST0 to ST2 and SK0 to SK2 specific to each line state. Therefore in the preferred embodiment, it is not a single domain algorithm, but a multi-domain algorithm with each domain corresponding to each state.

Referring to FIG. 3 again, the State Machine provides Vtarget and the applicable set of step ST and skip values for the current state and associated watermark WK limits in digital form. The value of Vtarget is coupled from the PWM Controller to the digital to analog converter (DAC) (it could be coupled directly to DAC) as the second input to the Up-down comparator, the output of which comparator determines the direction of the step ST, i.e., to increase the duty cycle of the DCDC switch & LC to increase the voltage Vbattery, or to decrease the duty cycle of the DCDC switch & LC to decrease the voltage Vbattery. In addition, in the preferred embodiments, the PWM Controller uses the output of the Low pass filter as a further input to smooth the rate of change of the output voltage Vbattery on state changes. Note that once the output voltage Vbattery reaches the target voltage Vtarget for the present state, the Up-down comparator will toggle up and down, toggling the duty cycle of the PWM Controller up and down with the respective WM0 steps. This will be filtered by the capacitor 150 (FIG. 1), so will only cause a small ripple on the output voltage Vbattery, which by selection of parameters, may be well within tolerable limits.

As previously described, in VoIP SLIC line control, different line states have very different voltage and current load conditions in a totally event driven fashion. For instance, the phone in the ringing state will have a 94V, 10 mA load until someone picks up the phone, then the line is in the Active state with 12V, 40 mA load. The PWM Controller needs to support the output voltage/load change on the fly with minimal ripple produced in the line voltage. Typically tip and ring demands −48V for IDLE state with zero current consumption, and −24V, 45 mA for the ACTIVE state. Instead of passively following the event driven line state switches with one set of equations and coefficients as described in the prior art, the preferred algorithm actively feeds the line state switch conditions to the PWM Controller, which in turn uses different sets of pulse width equations/coefficients (which preferably also have different WM0, WM1 and WM2 associated with each Step size and skip period for each state) that are known to be most suitable for each specific loading condition. Therefore, a complex single domain problem is partitioned into a multi-domain heterogeneous problem and a state driven PWM algorithm driven by the State Machine.

The preferred embodiment of the present invention is realized in an integrated circuit (the circuit within the dashed box of FIG. 1) and provides a flexible, high precision PWM algorithm tunable for a variety of applications that demand load switching in a wide range, especially for VoIP and other power management applications with a set of known loading states. With this algorithm, one can implement high precision, efficient switching power supplies in the digital domain to control external LC booster circuits to output desired voltages with minimal ripple on the line from one state to another. It is ideal for VoIP line control states such as OPEN, ON-HOOK, OFF-HOOK, ACTIVE and RINGING. The accurate, responsive and stable control algorithm for the DC-DC converter is achieved with the combined state switching and multi domain approach. In that regard, the specific DCDC switch & LC tank of FIG. 1 is presented as exemplary only, as various switching converter circuits controlled by controlling the duty cycle of the converter control signal or signals. Also it should be recognized that while the preferred embodiment uses a fixed frequency, variable duty cycle PWM Controller, this too is not a limitation of the invention, as a variable frequency PWM Controller could be used, such as one having a fixed on time with a variable off time between on times for control of the output of the converter.

The use of the multi-domain approach has been found to be highly tolerant and adaptive to variations of voltage and loading of the line. Also use of the multi-watermark, multi-step size and multi-skip steps regulates overshoot and undershoot and minimizes ripple and noise during all the operating modes by controlling overshoot and undershoot well before it happens. In that regard, note that on a change of state, the multi-watermark, multi-step size and multi-skip steps causes the output voltage Vbattery to first start accelerating from the prior Vtarget toward the new Vtarget, as opposed to imposing a step change in Vbattery within the abilities of the converter, and then to decelerate to reach the new Vtarget with minimum overshoot. The specific number and values for the watermarks, step sizes and skip steps may be varied as desired for any particular application. Also more than one state may use some of the same watermarks, step sizes or skip steps as an application may allow.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A pulse width modulation DCDC converter controller for controlling the voltage on a line responsive to a state of the line comprising:

an analog to digital converter (ADC) for coupling to the line;

a pulse width modulation (PWM) controller coupled to an output of the ADC to provide output pulses for controlling a switching converter circuit;

a line sensor for coupling to and sensing a state of the line, including a voltage on the line;

the PWM controller being coupled to an output of the line sensor and responsive to a plurality of ranges of the difference between a target voltage for the line and the voltage on the line, each range having associated therewith a step size and a skip step size, the PWM controller being configured to repetitively provide a number of equal pulse width pulses for coupling to a switching converter circuit responsive to the skip step size for a current range, the pulses being adjusted in pulse width relative to a previous pulse width responsive to the step size for the current range.

2. The converter controller of claim 1 wherein the ranges are line state dependent.

3. The converter controller of claim 2 wherein each line state has associated therewith a plurality of ranges.

4. The converter controller of claim 3 wherein the ranges are not equal for all states.

5. The converter controller of claim 3 wherein the smallest step size and the largest skip step size are associated to the range that includes the target voltage for the respective state.

6. The converter controller of claim 3 wherein the number of ranges for each state is three.

7. The converter controller of claim 1 wherein the line sensor is configured to sense line voltage and line current.

8. The converter controller of claim 7 further comprised of a state machine coupled between the line sensor and the PWM controller, the state machine being responsive to the line sensor to determine line state and provide control parameters to the PWM controller responsive to line state.

9. The converter controller of claim 1 further comprised of a filter coupled between the output of the ADC and the PWM controller.

10. A pulse width modulation DCDC converter controller for controlling the voltage on a line responsive to the state of the line comprising:

an analog to digital converter (ADC) for coupling to the line;

a pulse width modulation (PWM) controller coupled to an output of the ADC and to provide output pulses for controlling a switching converter circuit;

a line sensor for coupling to and sensing a state of the line, including a voltage on the line and current in the line;

an output of the line sensor being coupled to a state machine;

an output of the state machine being coupled to the PWM controller, the state machine being responsive to the line sensor to determine line state and provide control parameters to the PWM controller responsive to line state;

the PWM controller being responsive to a plurality of ranges of the difference between a target voltage and the voltage on the line for each state of the line, each range having associated therewith a step size and a skip step size, the PWM controller being configured to repetitively provide a number of equal pulse width pulses for coupling to a switching converter circuit responsive to the skip step size for an existing range, the pulses being adjusted in pulse width relative to a previous pulse width responsive to the step size for the existing range;

the ranges being line state dependent.

11. The converter controller of claim 10 wherein each line state has associated therewith a plurality of ranges.

12. The converter controller of claim 11 wherein the ranges are not equal for all states.

13. The converter controller of claim 11 wherein the smallest step size and the largest skip step size are associated to the range that includes the target voltage for the respective state.

14. The converter controller of claim 11 wherein the number of ranges for each state is three.

15. The converter controller of claim 10 further comprised of a filter coupled between the output of the ADC and the PWM controller.

16. A method of operating a pulse width modulation DCDC converter to control the voltage on a line based on the state of the line comprising:

a) sensing the state of the line, including the voltage on the line;

b) determining a target voltage for that state of the line;

c) determining the difference between the target voltage for that state of the line and the line voltage;

d) from a plurality of predetermined ranges of differences between target voltage and line voltage for that line state, determining which range the difference between the target voltage and the line voltage is in;

e) pulsing the converter with a number of equal pulse width pulses (skip step size) responsive to the state of the line and the range determined in d), the pulse width of the equal pulse width pulses being adjusted relative to a proceeding pulse width (step size) by an amount also responsive to the state of the line and the range determined in d).

17. The method of claim 16 further comprising:

f) successively repeating a) through e).

18. The method of claim 16 wherein the ranges are line state dependent.

19. The method of claim 16 wherein the ranges are not equal for all states.

20. The method of claim 16 wherein the smallest step size and the largest skip step size are associated with the range that includes the target voltage for the respective state.

21. The method of claim 16 wherein the number of ranges for each state is three.

22. The method of claim 16 wherein the state of the line is sensed by sensing line voltage and line current.

* * * * *